(12) United States Patent
Song et al.

(10) Patent No.: US 10,762,919 B1
(45) Date of Patent: Sep. 1, 2020

(54) MAGNETIC RECORDING WRITE HEAD WITH WRITE POLE HAVING A TAPERED TRAILING END SECTION WITH NEGATIVE MAGNETIC ANISOTROPY

(71) Applicant: Western Digital Technologies, Inc., San Jose, CA (US)

(72) Inventors: Suping Song, Fremont, CA (US); Zhanjie Li, Pleasanton, CA (US); Yaguang Wei, Pleasanton, CA (US); Terence Tin-Lok Lam, Cupertino, CA (US); Kuok San Ho, Emerald Hills, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/883,327

(22) Filed: Jan. 30, 2018

(51) Int. Cl.
   *G11B 5/31* (2006.01)
   *G11B 5/11* (2006.01)
   *G11B 5/127* (2006.01)

(52) U.S. Cl.
   CPC .............. *G11B 5/3153* (2013.01); *G11B 5/11* (2013.01); *G11B 5/1278* (2013.01); *G11B 5/315* (2013.01)

(58) Field of Classification Search
   None
   See application file for complete search history.

(56) References Cited

U.S. PATENT DOCUMENTS

| | | |
|---|---|---|
| 7,430,095 B2 | 9/2008 | Benakli et al. |
| 8,238,059 B1 | 8/2012 | Tang et al. |
| 8,264,792 B2 | 9/2012 | Bai et al. |
| 8,284,516 B1 | 10/2012 | Tang et al. |
| 8,498,079 B1 | 7/2013 | Song et al. |
| 8,547,660 B2 | 10/2013 | Allen et al. |
| 8,817,417 B2 | 8/2014 | Ukita et al. |

(Continued)

FOREIGN PATENT DOCUMENTS

JP       2012108981 A    6/2012

OTHER PUBLICATIONS

Yoshida et al. Abstract "Spin Torque Oscillator With Negative Magnetic Anisotropy Materials for MAMR", IEEE Transactions on Magnetics 46(6):2466-2469 • Jul. 2010, Abstract Only.

(Continued)

*Primary Examiner* — Craig A. Renner
(74) *Attorney, Agent, or Firm* — Thomas R. Berthold

(57) ABSTRACT

A perpendicular magnetic recording write head includes a main portion formed of conventional high-moment magnetic materials, and a beveled or tapered trailing portion formed of a Co/Fe multilayer with negative magnetic anisotropy (negative anisotropy constant or $-K_u$). The Co/Fe multilayer tapered trailing portion has a high saturation magnetization ($M_s$) and thus functions as part of the write pole to direct the flux perpendicularly to the recording layer. Also, the $-K_u$ Co/Fe multilayer tapered trailing portion has its hard axis oriented substantially orthogonal to the layer thickness and thus substantially prevents flux leakage into the write gap. The $-K_u$ Co/Fe multilayer may also be formed on the sides of the write pole in the cross-track direction to prevent flux leakage into the side gaps.

19 Claims, 6 Drawing Sheets

(56) References Cited

U.S. PATENT DOCUMENTS

| | | |
|---|---|---|
| 8,922,951 B2 | 12/2014 | Sapozhnikov et al. |
| 9,082,433 B1 | 7/2015 | Tang et al. |
| 9,202,528 B2 | 12/2015 | Furukawa et al. |
| 9,336,799 B2 | 5/2016 | Min et al. |
| 9,443,541 B1 | 9/2016 | Liu et al. |
| 9,679,587 B2 | 6/2017 | Taguchi et al. |
| 2012/0257305 A1 | 10/2012 | Tang et al. |

OTHER PUBLICATIONS

Chung et al., "Co/Fe multilayers with ultra-low damping and large negative anisotropy as the free layer for spin torque oscillator", Applied Physics Letters 109, 182401 (2016).

Okamoto et al., "Large Negative Magnetic Anisotropy in Epitaxially Grown Fe/Co Multilayer Films", J. Magn. Soc. Jpn 33, 451-454 (2009).

Vas'Ko et al., "Magnetic anisotropy of (110) Fe/Co superlattices", Applied Physics Letters 89, 092502 (2006).

MAGNETIC RECORDING WRITE HEAD WITH WRITE POLE HAVING A TAPERED TRAILING END SECTION WITH NEGATIVE MAGNETIC ANISOTROPY

BACKGROUND

Field of the Invention

This invention relates generally to perpendicular magnetic recording (PMR) systems, and more particularly to a PMR write head having an improved write pole.

Description of the Related Art

Perpendicular magnetic recording (PMR) in magnetic recording hard disk drives, wherein the recorded bits are stored in a perpendicular or out-of-plane orientation in the magnetic recording layer of the disk, allows for ultra-high recording density, i.e., the areal density of the recorded bits on the disk. To achieve high areal bit density the PMR write head must be able to write at high bit density (bits per inch or BPI) in the along-the-track direction but also at narrow track widths to achieve high tracks per inch (TPI) in the cross-track direction.

The PMR write head includes a write pole, a trailing shield, and a write gap with non-magnetic material between the write pole and the trailing shield. The trailing shield improves the magnetic field gradient in the along-the-track track direction, which is a key requirement for high BPI. The PMR write head also includes side shields in the cross-track direction that are spaced from the write pole by side gaps with non-magnetic material. The side shields prevent writing to data tracks adjacent to the track being written and thus define a narrow write bubble, which is important for achieving high TPI. To achieve high BPI and high TPI the write gap and side gaps should be as narrow as possible.

SUMMARY

In PMR write heads a narrow write gap and narrow side gaps can increase the likelihood of an unwanted flux path from the write pole, which reduces the writability of the write head to the recording layer. Thus a problem associated with PMR write heads is shunting of a portion of the flux from the write pole into the write gap and the side gaps. This reduces the flux to the recording layer, resulting in a reduction in BPI and TPI. This also results in a loss in overwrite (OW) performance. OW is a measure of the residual signal detected from a first written pattern after that pattern has been overwritten by a second pattern and is an important parameter for high performance disk drives.

In embodiments of this invention the write pole includes a main portion formed of conventional high-moment magnetic materials, and a beveled or tapered trailing portion formed of a Co/Fe multilayer with negative magnetic anisotropy (negative anisotropy constant or $-K_u$). The Co/Fe multilayer tapered trailing portion has a high saturation magnetization ($M_s$) and thus functions as part of the write pole to direct the flux perpendicularly to the recording layer. Also, the $-K_u$ Co/Fe multilayer tapered trailing portion has its hard axis oriented substantially orthogonal to the layer thickness and thus substantially prevents flux leakage into the write gap. In other embodiments the $-K_u$ Co/Fe multilayer is also formed on the sides of the write pole in the cross-track direction adjacent the side gaps.

For a fuller understanding of the nature and advantages of the present invention, reference should be made to the following detailed description taken together with the accompanying figures.

DETAILED DESCRIPTION

Figure 1:
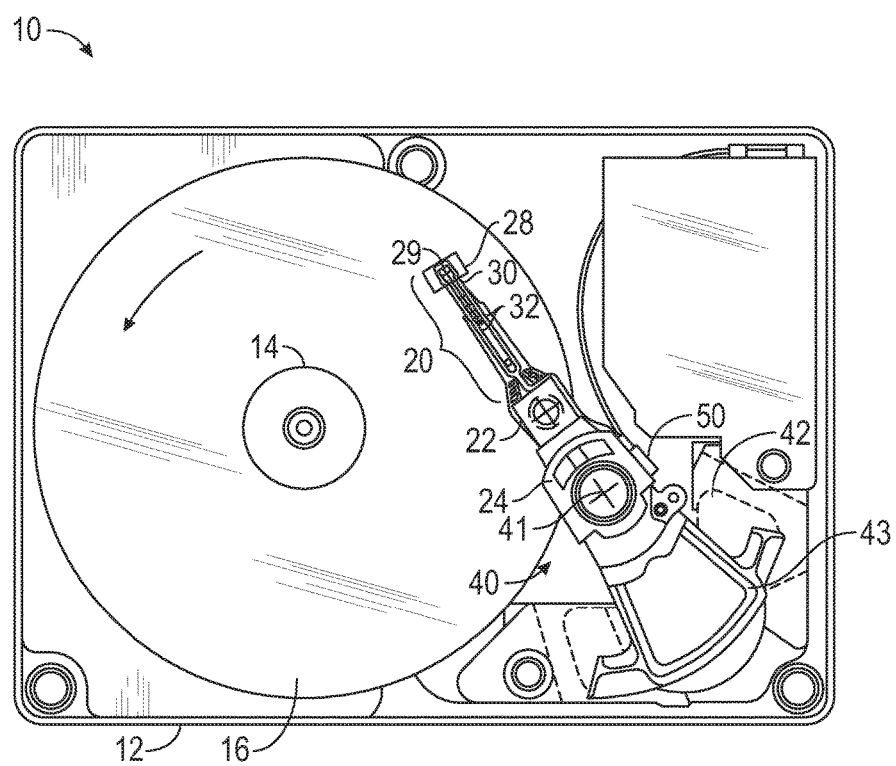
FIG. 1 is a top plan view of a conventional head/disk assembly of a hard disk drive with the cover removed that may function with the write head embodiments of the invention.

FIG. 1 is a top plan view of a conventional head/disk assembly of a hard disk drive with the cover removed that may function with the write head embodiments of the invention. The disk drive 10 includes a rigid base 12 supporting a spindle 14 that supports a stack of disks, including top disk 16. The spindle 14 is rotated by a spindle motor (not shown) for rotating the disks in the direction shown by curved arrow on disk 16. The hard disk drive 10 has at least one load beam assembly 20 having an integrated lead suspension (ILS) or flexure 30 with an array 32 of electrically conductive interconnect traces or lines. The load beam assemblies 20 are attached to rigid arms 22 connected to an E-shaped support structure, sometimes called an E-block 24. Each flexure 30 is attached to a gas-bearing slider 28. A magnetic recording read/write head 29 is located at the end or trailing surface of slider 28. The flexure 30 enables the slider 28 to "pitch" and "roll" on a gas-bearing (typically air or helium) generated by the rotating disk 16. Disk drive 10 also includes a rotary actuator assembly 40 rotationally mounted to the rigid base 12 at a pivot point 41. The actuator assembly 40 is a voice coil motor (VCM) actuator that includes a magnet assembly 42 fixed to base 12 and a voice coil 43. When energized by control circuitry (not shown) the voice coil 43 moves and thereby rotates E-block 24 with attached arms 22 and load beam assemblies 20 to position the read/write heads 29 to the data tracks on the disks. The trace interconnect array 32 connects at one end to the read/write head 29 and at its other end to read/write circuitry contained in an electrical module or chip 50 secured to a side of the E-block 24. The chip 50 includes a read preamplifier and a write driver circuit.

Figure 2A:
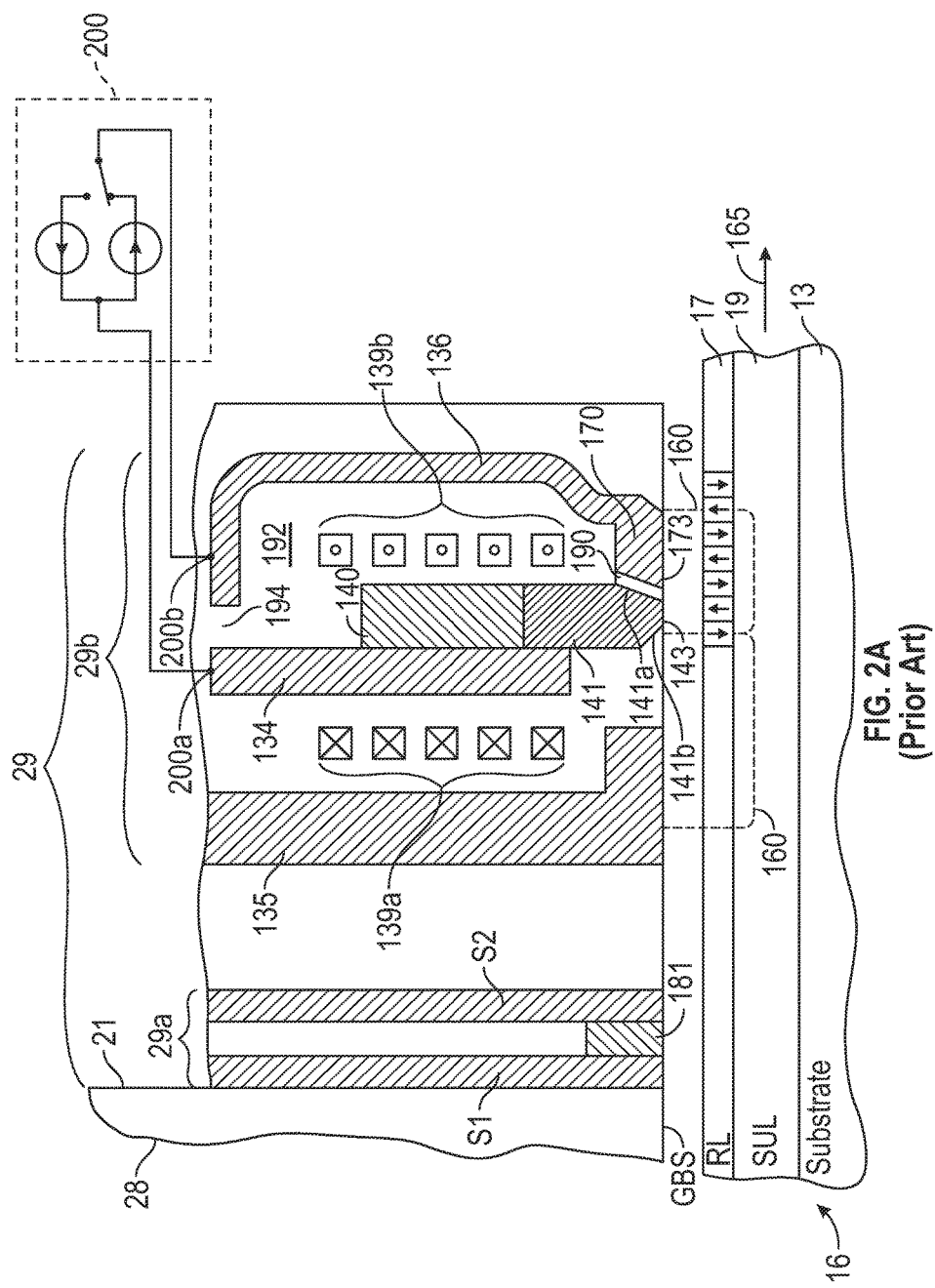
FIG. 2A is a side sectional view (not to scale) of a perpendicular magnetic recording (PMR) write head according to the prior art, a read head and a recording disk taken through a central plane that intersects a data track on the disk.

FIG. 2A is a side sectional view (not to scale) of a PMR write head 29b with write gap 190, a read head 29a and a recording disk 16 taken through a central plane that intersects a data track on the disk. As shown in FIG. 2A, a "dual-layer" disk 16 includes a perpendicular magnetic data recording layer (RL) 17 on a "soft" or relatively low-coercivity magnetically permeable underlayer (SUL) 19 formed on the disk substrate 13. The read/write head 29 is formed on slider 28 that has a disk-facing or gas-bearing surface (GBS) and includes read head 29a and write head 29b. Read head 29a includes a magnetoresistive (MR) read element or sensor 181 located between two magnetic shields S1, S2. The write head 29b is a PMR write head and includes a yoke structure with main pole 134, write pole 141 with upper portion 140 and disk-facing end 143, optional first flux return pole 135, second flux return pole 136, trailing magnetic shield 170 with disk-facing end 173, and write gap 190 between the write pole 141 and trailing shield 170. The write pole 141 has a tapered trailing end section 141a at the write gap 190 and an optional tapered leading end section 141b. The main pole 134, write pole 141, return poles 135, 136 and trailing shield 170 are formed of ferromagnetic materials, typically alloys of one or more of Co, Fe and Ni. The write pole 141 is typically formed of a high-moment CoFe alloy.

The write head 29b also includes a thin film coil 139a, 139b shown in section around main pole 134. The write coil 139a, 139b is a helical coil wrapped around main pole 134, but the write coil may also be a conventional dual "pancake" coil in which all the coil sections are in substantially the same plane and wrapped around the yoke. A flared write pole is part of the main pole 134 and has an upper portion 140 and a flared portion 141 with a pole tip that has an end 143 that faces the outer surface of disk 16. Write current through coil 139a, 139b induces a magnetic field (shown by dashed line 160) from the write pole 140 that passes through the RL 17 (to magnetize the region of the RL 17 beneath the write pole end 143), through the flux return path provided by the SUL 19, and back to the end of optional first return pole 135 and end 173 of trailing shield 170.

In a conventional PMR write head the write gap 190 is an insulator, typically alumina. In other types of PMR write heads, the write gap 190 will include an electrically-conductive structure. For example, the electrically-conductive structure may be a spin-torque oscillator (STO) that generates a high frequency oscillatory auxiliary magnetic field, such as in a microwave-assisted magnetic recording (MAMR) write head. Alternatively, the electrically-conductive structure may be a conductive layer that is not part of a STO for generating an Ampere field to assist switching of the write pole magnetization. The conductive layer may be formed of a material selected from Cu, Au, Ru, Cr, W, Mo, Pt, Rh and alloys thereof. In embodiments where the write gap includes an electrically-conductive structure, the write head 29b will also include electrical circuitry to generate current through the write gap 190. This is depicted by electrical circuitry 200 electrically connected to the main pole 134 and the second return pole 136. The circuitry 200 may include a voltage or current source (or a connection to an external voltage or current source) and one or more switching devices, such as transistors or relays that can switch the voltage or current on and off. The circuitry 200 is configured to provide a current or voltage to the main pole 134 and the return pole 136. For example, the circuitry 200 may provide a current between the main pole 134 and the return pole 136/trailing shield 170 that flows through write pole 141 and the conductive structure in the write gap 190 between the write pole 141 and trailing shield 170. An insulating material portion 192 (for example alumina) is provided around the magnetic coil between the main pole 134, the trailing shield 170 and the return pole 136. An electrically insulating material layer 194 (for example alumina) can be provided between end portions of the main pole 134 and the return pole 136 where the circuitry connections (i.e., electrical contacts 200a, 200b attached to the ends of the main pole 134 and return pole 136, respectively) are made (i.e., distal from the GBS).

The read/write head 29 is typically formed as a series of thin films deposited on a trailing surface 21 of gas-bearing slider 28 that has its GBS supported above the surface of disk 16. The MR read head 29a is comprised of MR sensor 181 located between MR shields S1 and S2 and is deposited on the trailing end 21 of the slider 28 prior to the deposition of the layers making up the write head 29b. In FIG. 2A, the disk 16 moves past the write head 29b in the direction indicated by arrow 165, so the portion of slider 28 that supports the read head 29a and write head 29b is often called the slider "trailing" end, and the surface 21 perpendicular to the slider GBS on which the write head 29b is located is often called the slider "trailing" surface.

The RL 17 is illustrated with perpendicularly recorded or magnetized regions, with adjacent regions having opposite magnetization directions, as represented by the arrows. The magnetic transitions between adjacent oppositely-directed magnetized regions are detectable by the MR sensor 181 as the recorded bits.

Figure 2B:
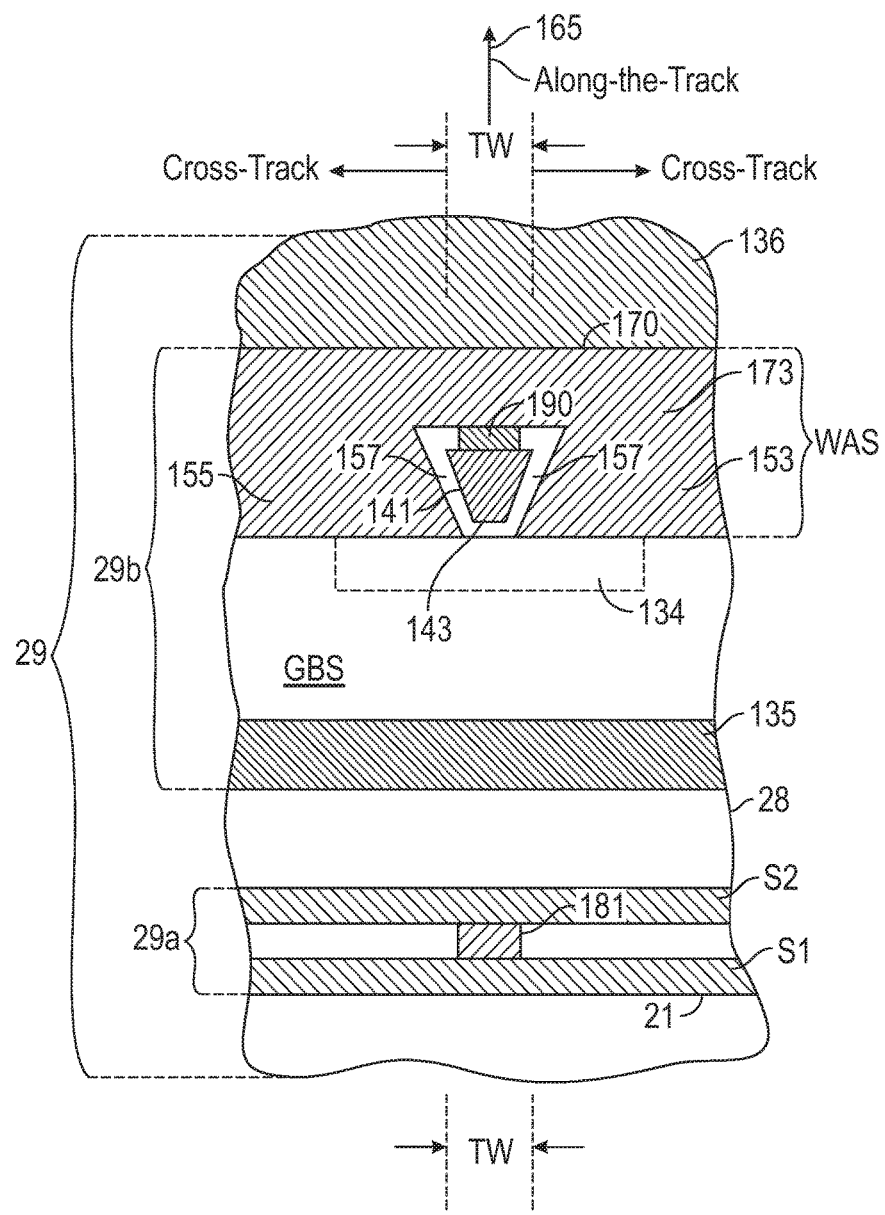
FIG. 2B is a view (not to scale) that illustrates the read head and write head according to the prior art as seen from the disk.

FIG. 2B is a view (not to scale) that illustrates the read head 29a and write head 29b as seen from the disk 16. The GBS is the recording-layer-facing surface of the slider 28 that faces the disk 16 (FIG. 2A) and is shown without the thin protective overcoat typically present in an actual slider. The recording-layer-facing surface shall mean the surface of the slider 28 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The disk 16 (FIG. 2A) moves relative to the read/write head 29 in the direction 165, which is called the along-the-track direction. The direction perpendicular to direction 165 and parallel to the plane of the GBS is called the cross-track direction. The width of the end 143 of write pole 141 in the cross-track direction substantially defines the track-width (TW) of the data tracks in the RL 17 (FIG. 2A). The main pole 134 is shown with dashed lines because it is recessed from the GBS (see FIG. 2A).

The portions identified as 153, 155 on opposite ends of trailing shield 170 are side shields that together with trailing shield 170 form a wraparound shield (WAS) that generally surrounds the write pole end 143. The shields 170, 153, 155 all have ends substantially at the recording-layer-facing surface, as shown by trailing shield end 173. The shields 170, 153, 155 are formed as a single-piece structure to form the WAS that substantially surrounds the write pole end 143 and are thus formed of the same material, typically a NiFe, CoFe or NiFeCo alloy, so that they have the same alloy composition. The side shields 153, 155 are separated from write pole end 143 by nonmagnetic electrically-insulative side gap material 157, typically alumina. The write gap 190 is between the write pole end 143 and the trailing shield 170. The WAS alters the angle of the write field and improves the write field gradient at the point of writing, and shields the writing field at regions of the RL away from the track being written. The WAS is shown as connected to the return pole 136. However, the WAS may be a "floating" WAS shield not connected to either the return pole 136 or other portions of the yoke by flux-conducting material. Also, instead of a WAS, the write head 29b may have separate side shields not connected to the trailing shield 170.

A problem associated with PMR write heads is shunting of a portion of the flux from the write pole into the write gap and the side gaps. This reduces the flux to the recording layer, resulting in a reduction in the in BPI and TPI, as well as a loss in overwrite (OW) performance.

In embodiments of this invention the write pole includes a main portion formed of conventional high-moment magnetic materials, and a beveled or tapered trailing portion formed of a Co/Fe multilayer with negative magnetic anisotropy (negative anisotropy constant or $-K_u$). The Co/Fe multilayer tapered trailing portion has a high saturation magnetization ($M_s$) and thus functions as part of the write pole to direct the flux perpendicularly to the recording layer. Also, the $-K_u$ Co/Fe multilayer tapered trailing portion has its hard axis oriented substantially orthogonal to the layer thickness and thus substantially prevents flux leakage into the write gap. In other embodiments the $-K_u$ Co/Fe multilayer is also formed on the sides of the write pole in the cross-track direction adjacent the side gaps.

The negative anisotropy constant ($-K_u$) of a magnetic film is defined as $1/2H_kM_s$, where $H_k=4\pi M_s-H_s$, and where $H_k$ is the effective anisotropy field, $H_s$ is the saturation field with applied field along the film normal, and $M_s$ is the saturation magnetization. If $H_s$ is greater than $4\pi M_s$, the film shows negative anisotropy energy and $K_u$ is negative.

Figure 4:
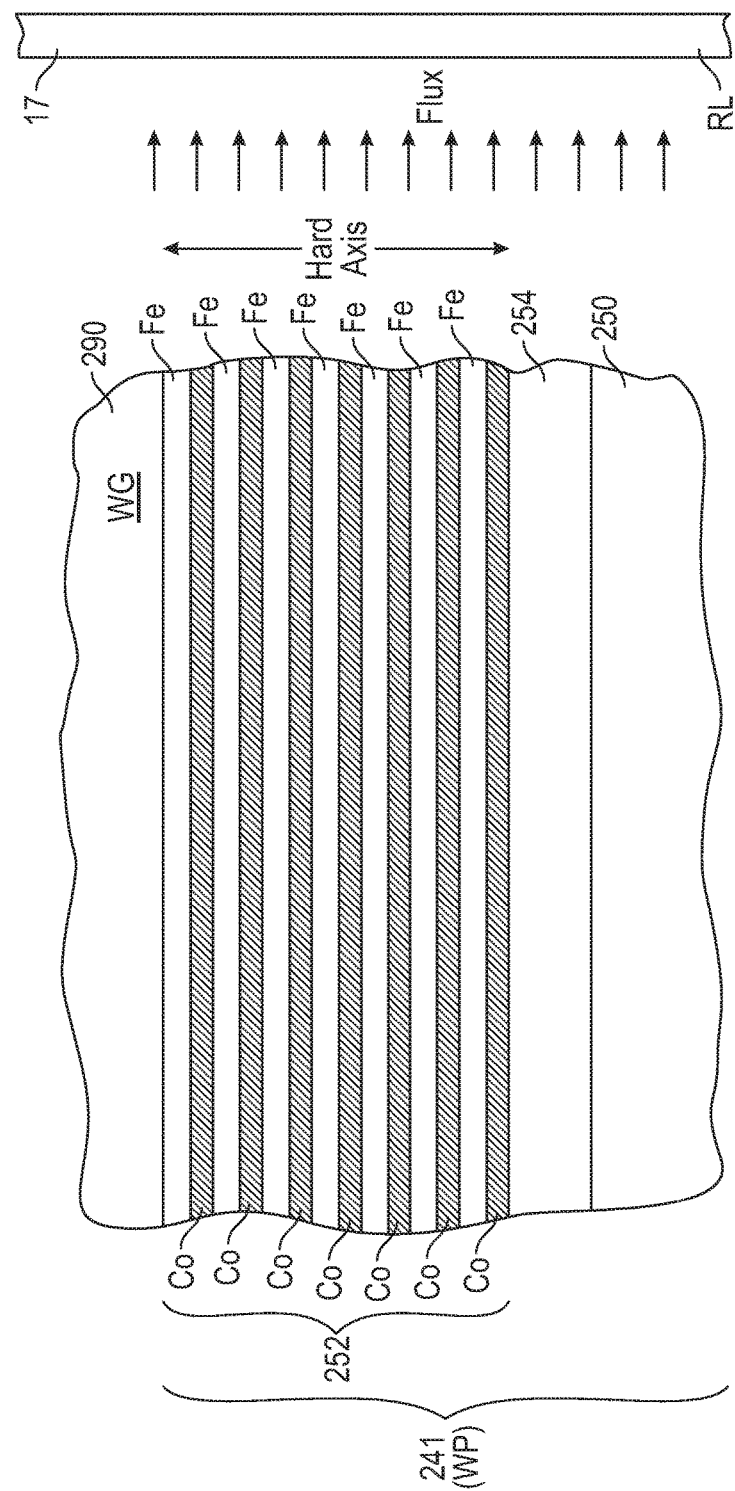
FIG. 4 is a sectional view (not to scale) illustrating the write head according to an embodiment of the invention with a negative magnetic anisotropy Co/Fe multilayer formed as multiple bilayers on the main portion of the write pole.

US 2012/0257305 A1 teaches a write pole with a film of cobalt-iridium (CoIr)—$K_u$ material not as part of the write pole but as a thin film on the taper portion of the write pole for blocking flux to the write gap (see FIG. 4 and FIG. 6). However, CoIr has low $M_s$ (less than about 1 T) and thus cannot function as part of the high-moment write pole. Also, CoIr is not as good as non-magnetic material for blocking flux in the write gap. U.S. Pat. No. 9,679,587 B2 teaches a write pole in a MAMR write head without a trailing taper wherein a CoIr—$K_u$ film is part of either the trailing shield (FIG. 14 of the '587 patent) or the write pole (FIG. 16 of the '587 patent). The low-$M_s$ CoIr film cannot function as part of the write pole but is used to prevent a "spin wave" which adversely affects the oscillation layer of the STO in the write gap of the MAMR head.

Figure 3:
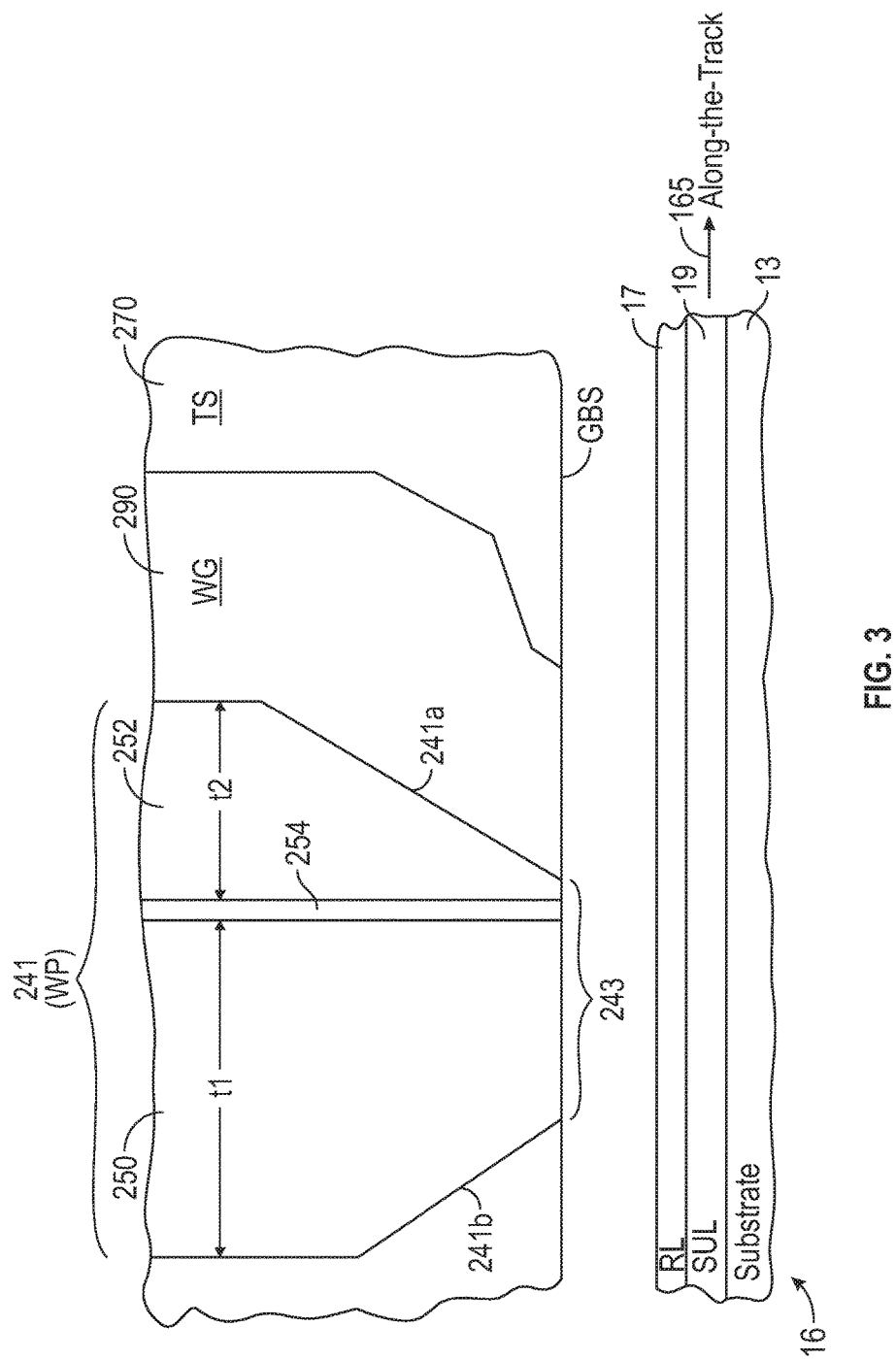
FIG. 3 is a side sectional view (not to scale) of a PMR write head according to an embodiment of the invention and a recording disk taken through a central plane that intersects a data track on the disk.

FIG. 3 is a side sectional view (not to scale) of a PMR write head according to an embodiment of the invention with write pole (WP) 241, write gap (WG) 290, and trailing shield (TS) 270. The write gap 290 may be a non-magnetic dielectric material like alumina if the write head is a conventional write head, or an electrically-conductive structure, such as a STO or a conductive layer that is not part of a STO. FIG. 3 illustrates the write head 241 with end 243 substantially at the GBS and facing the recording disk 16, which is depicted with substrate 13, SUL 19 and RL 17. The disk 16 moves relative to the write pole 241 in the direction of arrow 165 so that tapered surface 241b is referred to as the leading edge taper and surface 241a is referred to as the trailing edge taper.

The write pole 241 includes a main or non-trailing portion 250 and a tapered trailing portion 252. The main portion 250 can be formed of conventional high-moment material like CoFe and can have a thickness t1 in the along-the-track direction in the range of about 60 to 250 nm. The tapered trailing portion 252 is formed of a $-K_u$ Co/Fe multilayer and can have a thickness t2 in the along-the-track direction in the range of about 10-60 nm. A seed layer 254 is formed on the surface of main portion 250 that faces the WG and induces the Co/Fe multilayer to grow with the proper crystalline structure so as to have negative magnetic anisotropy. The seed layer 254 is any material that will induce a $-K_u$ in the Co/Fe multilayer and is preferably Ag or Ru. The seed layer 254 has a thickness preferably equal to or greater than 3 nm.

The Co/Fe multilayer is a stack of alternating Co/Fe layers with a total thickness in the range of about 10-60 nm. If the individual Co and Fe layers have substantially the same thickness then in one embodiment a Co/Fe bilayer can have a thickness in the range of about 0.3 to 1.5 nm. Thus approximately 7 to 33 bilayers would result in a thickness of about 10 nm and approximately 40 to 200 bilayers would result in a thickness of about 60 nm. The Co/Fe multilayer with this range of number of bilayers and range of thicknesses will have a $K_u$ in the range of about $-0.5\times10^6$ Joules/m³ to about $-1.0\times10^6$ Joules/m³.

FIG. 4 is a sectional view illustrating the Co/Fe multilayer formed as 7 bilayers on the seed layer 254 formed on main portion 250. The Co/Fe multilayer is not required to have a discrete number of bilayers but can have the first and last layer in the stack formed of the same material, i.e., either Co or Fe. The hard axis of tapered trailing portion 252 is perpendicular to the individual Co and Fe layers, which prevents shunting of flux from the main portion 250 to the WG 290. Also, the $-K_u$ Co/Fe multilayered tapered trailing potion 252 has high $M_s$ (about 2 T) and thus forms part of the WP 241 that directs flux in the direction of the RL 17.

A computer simulation compared the BPI and OW performance of a PMR write head with a 250 nm thick WP having a 60 nm thick Co/Fe multilayer ($M_s$=2.1 T; $K_u$=-1.0×10⁶ Joules/m³) tapered trailing portion (like that depicted in FIG. 3) with a write head having a conventional WP of the same total thickness. The write head with the $-K_u$ tapered trailing portion showed a 3% improvement in BPI and a 2 dB gain in OW.

Figure 5:
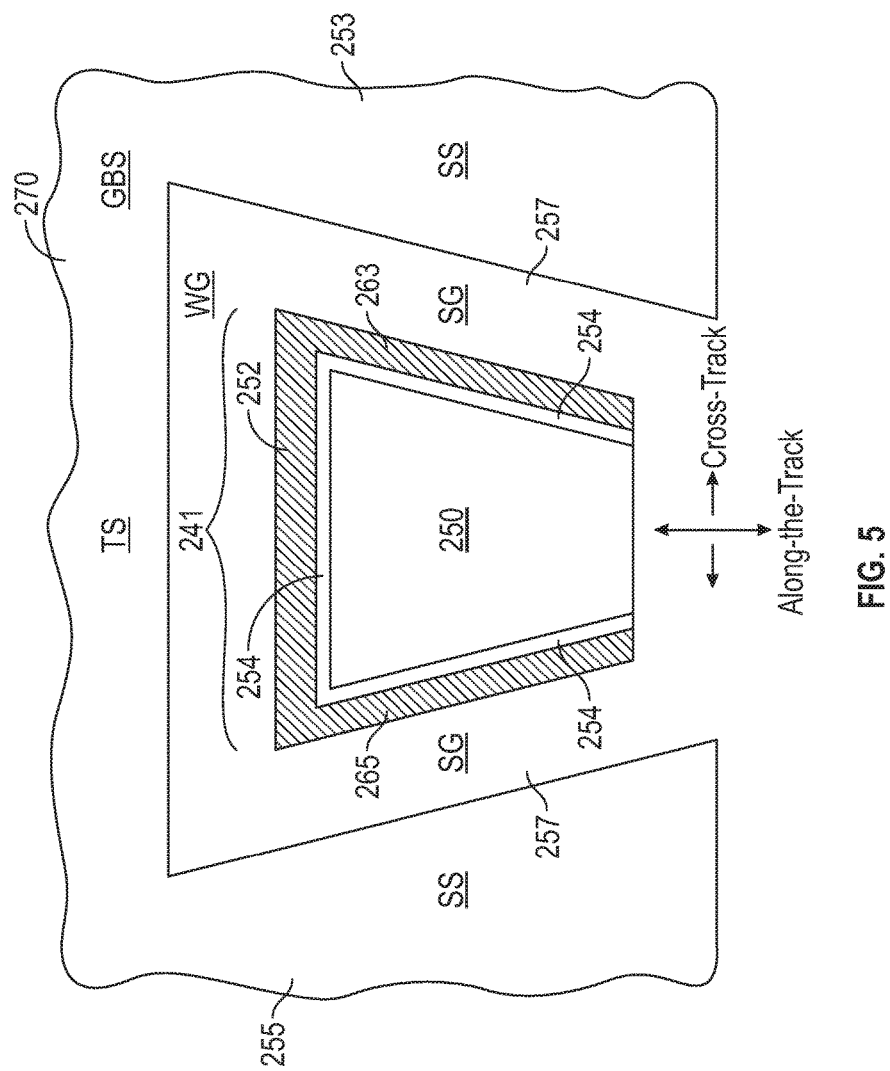
FIG. 5 is a view (not to scale) of the gas bearing surface (GBS) as seen from the disk of another embodiment of the invention wherein a negative magnetic anisotropy Co/Fe multilayer is also formed on the sides of the write pole adjacent the side gaps.

FIG. 5 is a view of the GBS as seen from the disk of another embodiment of the write head wherein the $-K_u$ Co/Fe multilayer is also formed on the sides of the WP adjacent each side gap (SG). The WP 241 includes the main or non-trailing portion 250, the seed layer 254 and the $-K_u$ Co/Fe multilayer tapered trailing portion 252, which is adjacent to the WG 290, as described in FIG. 3. In addition, in the cross-track direction, a seed layer 254 is also formed on each side of the main WP main portion 250, and a —Ku Co/Fe multilayer 263, 265 is located on the side seed layers 254. The write head includes the TS 270 in the along-the-track direction but also a side shield (SS) 253, 255 on each side of the WP 241. Each SS 253, 255 is spaced from the WP 241 by a non-magnetic side gap (SG) 257, which is typically alumina. The $-K_u$ Co/Fe side multilayers 263, 265 direct the flux perpendicularly (in the directions into and out of the paper) and substantially prevent flux leakage into the side gaps 257.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing data tracks in a magnetic recording disk, the write head comprising:

a write pole having an end for facing the disk; and a trailing shield having an end for facing the disk, the write pole end and trailing shield end being spaced apart to define a write gap;

wherein the write pole further comprises a trailing portion having a taper adjacent the write gap, a non-trailing portion having no trailing taper, and a seed layer between the trailing portion and the non-trailing portion, the trailing portion having negative magnetic anisotropy and comprising a multilayer of alternating layers of Co and Fe.

2. The head of claim 1 wherein the trailing portion has a thickness in an along-data-track direction greater than or equal to 10 nm and less than or equal to 60 nm.

3. The head of claim 1 wherein said multilayer comprises $(Co/Fe)_n$ where n represents the number of Co/Fe bilayers and is greater than or equal to 7 and less than or equal to 200.

4. The head of claim 3 wherein the thicknesses of the Co and Fe in each Co/Fe bilayer are substantially equal and greater than or equal to 0.3 nm and less than or equal to 1.5 nm.

5. The head of claim 1 wherein the seed layer is formed of a material that induces negative magnetic anisotropy in said multilayer.

6. The head of claim 5 wherein the seed layer material is selected from Ag and Ru.

7. The head of claim 1 wherein the seed layer has a thickness in an along-data-track direction greater than or equal to 3 nm.

8. The head of claim 1 wherein the write gap is electrically conducting and further comprising electrical circuitry connected to the write pole and the trailing shield.

9. The head of claim 8 further comprising an electrically-conductive layer in the write gap and formed of a material selected from Cu, Au, Ru, Cr, W, Mo, Pt, Rh and alloys thereof.

10. The head of claim 8 further comprising a spin-torque oscillator (STO) in the write gap.

11. The head of claim 1 further comprising a side shield on each side of the write pole in a cross-track direction, a side gap of non-magnetic material between the write pole and each side shield, a side seed layer on each side of the write pole, and a side multilayer of alternating layers of Co and Fe on each side seed layer, the side multilayers having negative magnetic anisotropy.

12. The head of claim 1 further comprising an electrically conductive coil coupled to the write pole, the write pole configured to generate a magnetic write field in the presence of electrical write current through the coil.

13. A magnetic recording disk drive comprising:
the write head of claim 12; and a rotatable magnetic recording disk having a perpendicular magnetic recording layer with data tracks.

14. A perpendicular magnetic recording disk drive write head for magnetizing regions in data tracks of a magnetic recording layer on a disk, the write head being formed on a slider having a gas-bearing surface (GBS), the write head comprising:

a write pole formed of ferromagnetic material and having an end substantially at the GBS;

a trailing shield formed of ferromagnetic material and having an end substantially at the GBS, the write pole end and trailing shield end being spaced apart to define a write gap, wherein an along-track line on the write head is a line substantially orthogonal to the gap and substantially parallel to the GBS, and a cross-track line on the write head is a line substantially orthogonal to the along-track line and substantially parallel to the GBS; and a pair of ferromagnetic side shields, the side shields having ends for facing the disk and being spaced on opposite sides of the write pole end on the cross-track line to define side gaps;

wherein the write pole further comprises a trailing portion having a taper adjacent the write gap, a non-trailing portion having no trailing taper, and a seed layer between the trailing portion and the non-trailing portion, the trailing portion having negative magnetic anisotropy and comprising a multilayer of alternating layers of Co and Fe.

15. The write head of claim 14 further comprising a side seed layer on each side of the write pole and a side multilayer of alternating layers of Co and Fe on each side seed layer, each side multilayer having negative magnetic anisotropy.

16. The write head of claim 15 wherein said trailing portion multilayer and each side multilayer comprises $(Co/Fe)_n$, where n represents the number of Co/Fe bilayers and is greater than or equal to 7 and less than or equal to 200.

17. The write head of claim 16 wherein the thicknesses of the Co and Fe in each Co/Fe bilayer are substantially equal and greater than or equal to 0.3 nm and less than or equal to 1.5 nm.

18. The write head of claim 14 further comprising an electrically conductive coil coupled to the write pole, the write pole configured to generate a magnetic write field in the presence of electrical write current through the coil.

19. A magnetic recording disk drive comprising:
the write head of claim 18; and
a rotatable magnetic recording disk having a perpendicular magnetic recording layer with data tracks.

\* \* \* \* \*